(12) United States Patent
Corfe et al.

(10) Patent No.: US 7,770,615 B2
(45) Date of Patent: Aug. 10, 2010

(54) RING SAW

(75) Inventors: Phillip Corfe, Grande Prairie (CA); Lester Oilund, Grande Prairie (CA)

(73) Assignee: 1279059 Alberta Ltd., Grand Prairie (CA)

( * ) Notice: Subject to any disclaimer, the term of this patent is extended or adjusted under 35 U.S.C. 154(b) by 253 days.

(21) Appl. No.: 11/949,672

(22) Filed: Dec. 3, 2007

(65) Prior Publication Data

US 2008/0142118 A1    Jun. 19, 2008

(30) Foreign Application Priority Data

Dec. 13, 2006  (CA) .................................. 2569603

(51) Int. Cl.
*B27C 1/00*  (2006.01)
(52) U.S. Cl. ...................... 144/34.1; 144/218; 144/235; 83/676
(58) Field of Classification Search ................. 144/4.1, 144/34.1, 34.5, 218, 223, 176, 234, 235; 83/842, 843, 665, 666, 676; 125/13.02
See application file for complete search history.

(56) References Cited

U.S. PATENT DOCUMENTS

| | | | | |
|---|---|---|---|---|
| 4,817,692 A | * | 4/1989 | Denis .......................... | 144/4.1 |
| 4,987,935 A | * | 1/1991 | Corcoran et al. ........... | 144/34.1 |
| 5,373,875 A | * | 12/1994 | Fenton et al. ............... | 144/218 |

* cited by examiner

*Primary Examiner*—Shelley Self
(74) *Attorney, Agent, or Firm*—Christensen O'Connor Johnson Kindness PLLC

(57) ABSTRACT

A ring saw includes a disc body having a circumferential edge with a first circumferential bearing groove. A cutting ring is mounted for rotation about the circumferential edge of the body. The cutting ring has an inner annular surface that carries both a circumferential gear profile and a second circumferential bearing groove. Ball bearings are positioned in side by side relation in a circumferential bearing race defined by the first circumferential bearing groove and the second circumferential bearing groove. A circumferential seal is provided between the body and the cutting ring, which is adapted to prevent abrasives from entering into the bearing race and interfering with ball bearings. At least one driving gear is carried by the body and engaged with the circumferential gear profile to impart rotational movement to the cutting ring.

3 Claims, 2 Drawing Sheets

RING SAW

FIELD

The present invention relates to a saw having a circular disc-shaped body with a circumferential edge and a cutting ring mounted for rotation about the circumferential edge. The cutting ring has an inner annular surface with gear teeth, which enables the cutting ring to be rotated by drive gears.

BACKGROUND

U.S. Pat. No. 5,373,875 (Fenton et al.) discloses a ring saw that is serviceable for most applications. There is a need, however, to reduce weight and power requirements. One example in which weight and power requirements are important is with aerial logging. Canadian Patent No. 1,291,396 (Laurent) discloses an alternative ring saw configuration of simplified construction using bearing strips made from a plastic material having a low coefficient of friction.

SUMMARY

According there is provided a ring saw which includes a disc body having a circumferential edge with a first circumferential bearing groove. A cutting ring is mounted for rotation about the circumferential edge of the body. The cutting ring has an inner annular surface that carries both a circumferential gear profile and a second circumferential bearing groove. Ball bearings are positioned in side by side relation in a circumferential bearing race defined by the first circumferential bearing groove and the second circumferential bearing groove. A circumferential seal is provided between the body and the cutting ring, which is adapted to prevent abrasives from entering into the bearing race and interfering with ball bearings. At least one driving gear is carried by the body and engaged with the circumferential gear profile to impart rotational movement to the cutting ring.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION

Figure 1:
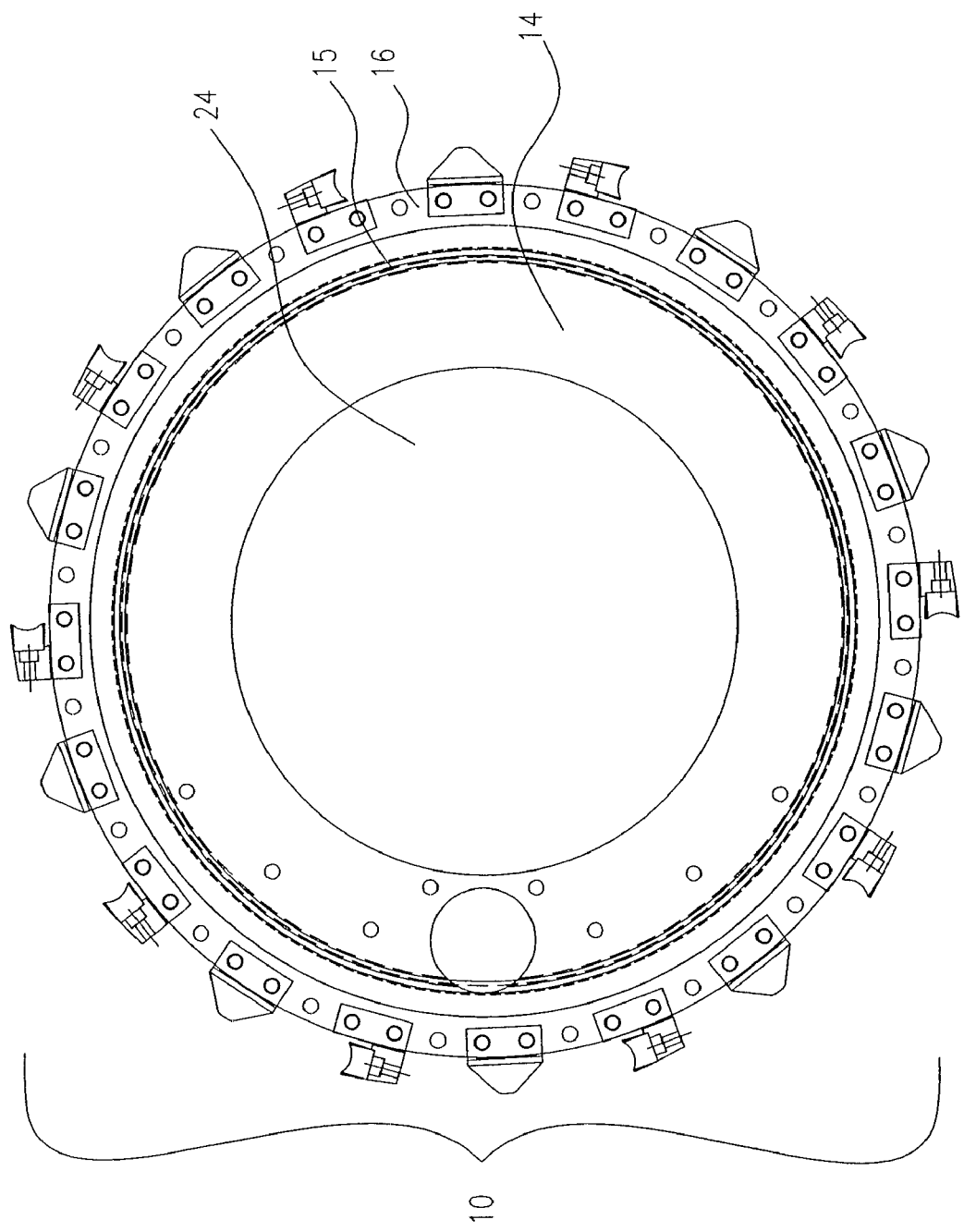
FIG. 1 is a top plan view of a ring saw.

A ring saw generally identified by reference numeral 10, will now be described with reference to FIGS. 1 and 2.

Structure and Relationship of Parts:

Referring to FIG. 1, ring saw (10) has a circular disk shape saw body (14). Saw body (14) has a circumferential edge (15). A cutting ring (16) is mounted for rotation about circumferential edge (15).

Figure 2:
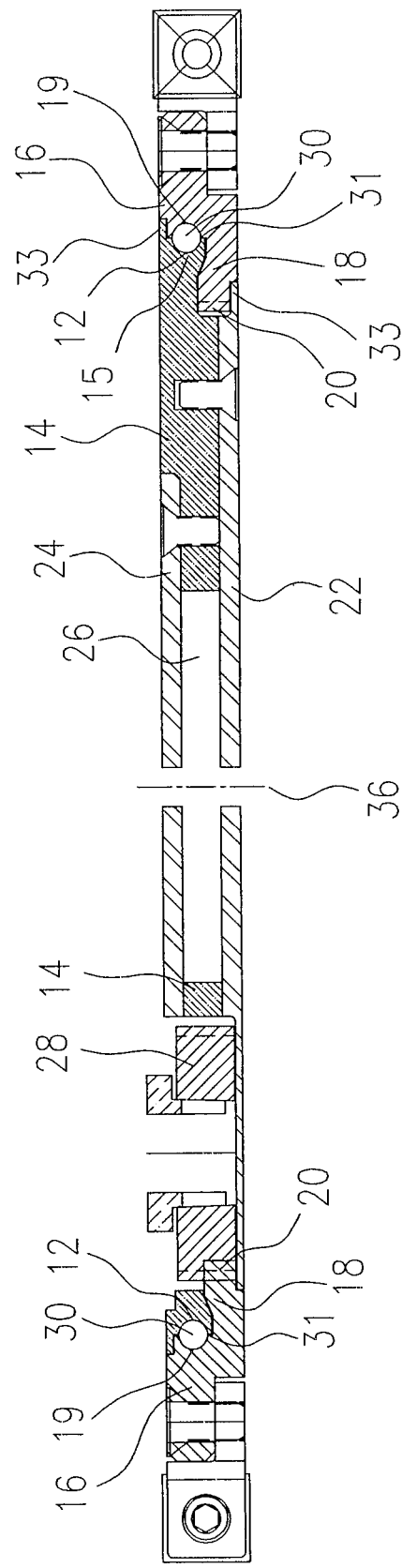
FIG. 2 is a side elevation view, in section, of the ring saw illustrated in FIG. 1.

Referring to FIG. 2, circumferential edge (15) of body (14) has a first circumferential bearing groove (12). Cutting ring (16) has an inner annular surface (18) that carries a circumferential gear profile in the form of inwardly projecting gear teeth (20). A pinion driving gear (28) is carried by body (14) and engages gear teeth (20) on inner annular surface (18) to rotate cutting ring (16). A second circumferential bearing groove (19) is also carried by inner annular surface (18) of cutting ring (16). Ball bearings (30) are encased in a circumferential bearing race (31) formed by first circumferential bearing groove (12) and second circumferential bearing groove (19). Ball bearings (30) are positioned in side by side relation filling circumferential bearing race (31), thereby centering cutting ring (16) relative to body (14). Ball bearings (30) support and carry all axial and radial loads placed upon cutting ring (16). Cutting ring (16) and body (14) have sealing surfaces (33) which prevent dirt and debris from entering into circumferential bearing race (31). Body (14) has a bottom face defined by a bottom filler plate (22) that mates with cutting ring (16) and forms sealing surface (33) sealing bottom face below saw ring gear teeth (20). Body (14) also has a top face, defined by top filler plate (24), which encloses an upper portion of body creating a cavity (26) reducing saw weight.

Referring to FIG. 2, in order to provide greater stability, circumferential gear profile in the form of gear teeth (20) and second circumferential bearing groove (19) are offset. This allows an overlapping of cutting ring (16) and body (14) to occur, which assists in formation of sealing surfaces (33) and provides a thinner saw profile. Gear teeth (20) are offset toward the bottom face denoted by bottom filler plate (22). Second circumferential bearing groove (19) is offset toward the top face as denoted by top filler plate (24). It should be noted that offsets could be reversed. Body (14) has a central axis (36). Gear teeth (20) and second circumferential bearing groove (19) are offset so that they are positioned at different distances from central axis (36).

Operation:

By way of background, ring saws used in the forestry industry for cutting down trees are subjected to significant radial and axial loading. Radial loading occurs as the cutting ring engages the tree. Axial loading occurs as cutting progresses and the weight of the tree bears upon the cutting ring. With the Laurent patent reference identified above, the engagement between the bearing strips and the inwardly projecting annular flange on the cutting ring is intended to serve a dual purpose of a bearing surface and a sealing surface. However, the plastic bearing material of the bearing strips will invariably experience deterioration under heavy axial loading which reduces its ability to function as a sealing surface. Without effective sealing dirt and debris enter into the gears and decrease the operational life of the gears. The number of rotations per minute of the cutting ring is limited by the friction properties of the plastic bearing material of the bearing strips. The gears are required to perform a centering function and are subjected to radial loads, which reduce the operational life of the gears. The Fenton et al patent reference uses between seven and ten rollers to center the cutting ring relative to the saw body while withstanding axial and radial loads placed upon the cutting ring. The roller type ring saw of Fenton et al makes it difficult to manufacture a narrow kerf saw while maintaining good axial & radial loading.

Referring to FIG. 2, ring saw 10 is characterized by a cutting ring (16) which supported on approximately two hundred ball bearings (30), which are encased in circumferential bearing race (31) between first circumferential bearing groove (12) and second circumferential bearings groove (19). This increases the axial & radial loading substantially and provides the ability to manufacture a much thinner saw body. This thinner saw body greatly reduces the weight and power requirements of the entire unit. The ball bearings (30) serve to center cutting ring (16) relative to saw body (14) while withstanding axial and radial loads placed upon cutting ring (16). Ball bearings (30) give continuous support around the periphery of cutting ring (16) while keeping a compact bearing surface. The axial and radial loading is spread over a much greater surface area while keeping the overall size and weight of ring saw (10) to a minimum. With this lighter narrower saw, power requirements and overall weight are much lower when compared to the Fenton et al roller type ring saw. This makes the cutting apparatus much more efficient through the cut and keeps it lighter for adaptability to many other kinds of apparatus.

With previous art in this application, it is difficult to have high axial & radial loading in a compact design. With ball bearings (30), there is less over hanging load, increased contact surface, simplified design and compactness. With ring saw (10), as described, the gears do not have to bear any axial and radial loads. The gears only function is to drive cutting ring (16) which greatly prolongs their operating life.

Variations:

Although ring saw (10) was developed with aerial logging in mind, there are a large number of other applications in which lighter weight, reduced power requirements and a narrow kerf are of value. Although driving gear (28) and ball bearings (30) are shown as being offset. An embodiment could be configured that had driving gear (28) and ball bearings (30) on the same plane.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A ring saw, comprising:
   a disc body having a circumferential edge with a first circumferential bearing groove;
   a cutting ring mounted for rotation about the circumferential edge of the body, the cutting ring having an inner annular surface that carries both a circumferential gear profile and a second circumferential bearing groove;
   ball bearings positioned in side by side relation in a circumferential bearing race defined by the first circumferential bearing groove and the second circumferential bearing groove;
   a circumferential seal between the body and the cutting ring adapted to prevent abrasives from entering into the bearing race and interfering with ball bearings; and
   at least one driving gear carried by the body and engaged with the circumferential gear profile to impart rotational movement to the cutting ring.

2. A ring saw, comprising:
   a disc body having a top face, a bottom face, and a circumferential edge with a first circumferential bearing groove;
   a cutting ring mounted for rotation about the circumferential edge of the body, the cutting ring having an inner annular surface that carries both a circumferential gear profile and a second circumferential bearing groove, the circumferential gear profile being offset toward one of the top face and the bottom face and the second circumferential bearing groove being offset toward the other of the top face or the bottom face;
   ball bearings positioned in side by side relation in a circumferential bearing race defined by the first circumferential bearing groove and the second circumferential bearing groove;
   a circumferential seal between the body and the cutting ring adapted to prevent abrasives from entering into the bearing race and interfering with ball bearings; and
   at least one driving gear carried by the body and engaged with the circumferential gear profile to impart rotational movement to the cutting ring.

3. A ring saw, comprising:
   a disc body having a central axis and a circumferential edge with a first circumferential bearing groove;
   a cutting ring mounted for rotation about the circumferential edge of the body, the cutting ring having an inner annular surface that carries both a circumferential gear profile and a second circumferential bearing groove, the circumferential gear profile and the second circumferential bearing groove being offset so that the circumferential gear profile and the second circumferential bearing groove are at different distances from the central axis;
   ball bearings positioned in side by side relation in a circumferential bearing race defined by the first circumferential bearing groove and the second circumferential bearing groove;
   a circumferential seal between the body and the cutting ring adapted to prevent abrasives from entering into the bearing race and interfering with ball bearings; and
   at least one driving gear carried by the body and engaged with the circumferential gear profile to impart rotational movement to the cutting ring.

* * * * *